United States Patent [19]

McMahon

[11] 4,273,251
[45] Jun. 16, 1981

[54] SAFETY DEVICE

[75] Inventor: John B. McMahon, Eastwood, Australia

[73] Assignee: The Commonwealth Industrial Gases Limited, Surry Hills, Australia

[21] Appl. No.: 116,732

[22] Filed: Jan. 30, 1980

[30] Foreign Application Priority Data

Feb. 1, 1979 [AU] Australia .............................. PD7525

[51] Int. Cl.³ ........................ B65D 51/16; F16K 17/40
[52] U.S. Cl. ..................................... 220/361; 137/72; 220/89 B
[58] Field of Search .................. 137/72, 74; 220/89 B, 220/361, 363, 364

[56] References Cited

U.S. PATENT DOCUMENTS

| 900,763 | 10/1908 | McNutt | 220/89 B |
| 937,713 | 10/1909 | Page | 220/89 B |
| 1,068,675 | 7/1913 | Lightfoot | 220/89 B |
| 3,797,692 | 3/1974 | Santoni | 220/363 |

Primary Examiner—Allan N. Shoap
Attorney, Agent, or Firm—Beveridge, DeGrandi, Kline & Lunsford

[57] ABSTRACT

A fusible safety device for a pressure vessel includes a body of fusible material in the form of a tablet which acts as a leak-proofing gasket and is so arranged as not to be vulnerable to creep movement under normal temperature and pressure. The tablet is seated on a floor in a counterbore which puts the inside of the vessel in communication with atmosphere. The tablet is firmly compressed against the floor by a pressure plate in turn loaded by a sleeve screwing within the counterbore. The gas venting passage through the counterbore consists of a vent bore being the lesser diameter portion of the counterbore, and one or more holes in the pressure plate which are essentially out of axial alignment with the vent bore.

3 Claims, 3 Drawing Figures

SAFETY DEVICE

This invention relates to fusible safety devices for pressure vessels such as those metal cylinders used for storage of gases under pressure. These vessels are fitted with safety devices designed to vent the vessel contents in the event of excessive pressure arising in the vessel, which could result in bursting thereof, due to fire or other over-heating circumstances.

FIG. 1 of the drawings shows in medial cross section a fusible safety device of the prior art.

Figure 1:
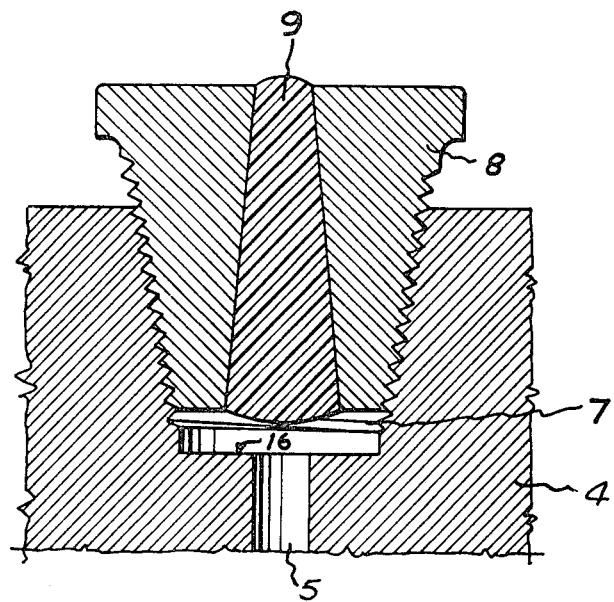

Referring to FIG. 1, the vessel indicated at 4, has a bore 5 which opens to the vessel interior at one end, and at its other end to a floor 6 defining the inner end of a counter-bore 7 whereof the outer end opens to atmosphere. The walls of the counter-bore are taper threaded to accommodate a correspondingly threaded sleeve 8 having frusto-conical bore filled with fusible material 9.

A shortcoming of the device shown in FIG. 1 is that gas pressure inside the vessel tends to extrude the fusible material through the atmosphere end of sleeve 8. The fusible material, in addition to having a relatively low melting point, is also of low physical strength, and this, under sustained pressure, causes the fusible material to creep, largely due to internal shear stress, even at ordinary working temperatures. This can result in vent-making deformation of the fusible material or outright expulsion of it from the sleeve bore. A further, less-serious, disability of the prior art device is that it is wholly reliant on gas-tight accuracy of the screw-thread connection between counter-bore 7 and sleeve 8 to remain leak-proof.

In an endeavour to ameliorate the defects mentioned, it is common for the fusible material to be frustro-conical and the threading to be tapered, both as shown in FIG. 1. Experiment has revealed however, that these expedients do not effectively remedy the shortcomings; moreover, in a relatively minor way, they add to the production and maintenance complexity of the prior device.

The object of the present invention is to overcome the mentioned disabilities in a very simple manner; that is, by virtual elimination of creep-inducing shear stress in the fusible material, without necessity for taper threading or even well-fitted threads, and without necessity for tapered bore formation on the part of the sleeve or any other part of the device; and this, while utilising the fusible material, in the form of a readily replaceable pellet or tablet, which by reason of its relative softness, acts (during normal usage of the vessel) as a gasket ensuring against gas leakage without need to make other provision to that end.

The invention provides a fusible safety device for a pressure vessel having a counter-bore formed in the vessel wall with an outer end open to atmosphere and an inner end defined by a floor, and a vent bore having an inner end open to the vessel interior and an outer end opening to said floor; comprising:

(a) a tablet of fusible material able to rest on said floor in coverage of the outer end of said vent bore, (b) a sleeve screw-threaded into said counter-bore, (c) a rigid pressure plate tightly sandwiched between said tablet and said sleeve, and (d) at least one hole in said pressure plate axially displaced relative to said vent bore.

Two examples of the invention are illustrated in the drawings herewith.

Figure 2:
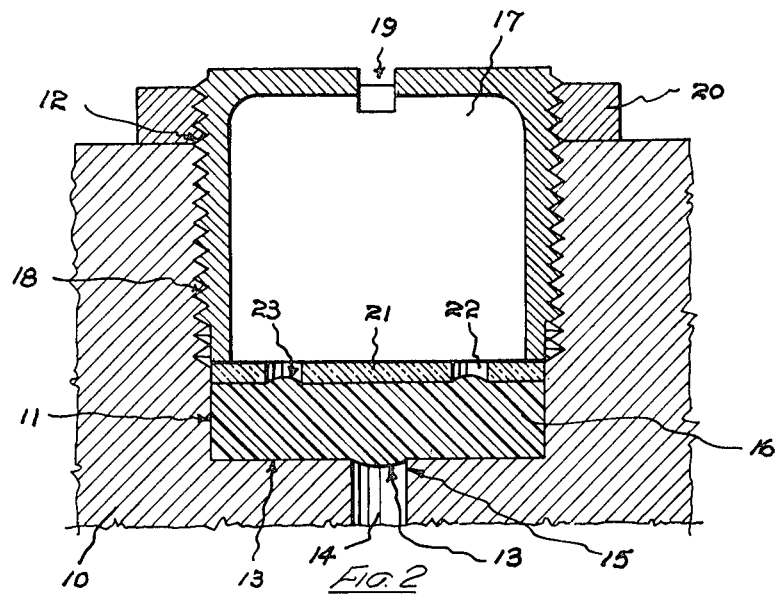
FIG. 2 is a view similar to FIG. 1 showing one form of the invention.

Referring to FIG. 2, a pressure vessel wall 10 has a counter-bore 11 formed in it with its outer end 12 open to atmosphere and its inner end defined by a floor 13. A vent bore 14 has its inner end (not shown) open to the inside of the vessel and its outer end 15 open to floor 13. A tablet 16 of fusible material rests on floor 13 so as to cover the upper end of the vent bore. A sleeve 17 is plain-threaded, at 18, within the counter-bore and is furnished with means to turn it such as the screw-driver slot indicated at 19. It may also be provided with a lock-nut 20. A pressure plate 21 of flat steel or other rigid material is sandwiched between sleeve 17 and tablet 16.

Plate 21 has one or more holes 22 in it. It is essential that none of these holes be in axial alignment with vent bore 14. Indeed, the further holes 22 are axially displaced from bore 14, within practical limits, the better; although, we have found that if holes 22 are only slightly out of line with bore 14, the purposes of the invention will be served to an advantageous extent.

In use, the sleeve 17 is firmly tightened against plate 21, and this causes the relatively soft material of tablet 16 to bulge into holes 22 and bore 14 as indicated at 23. This engenders a sufficient compressive loading on tablet 16 for it to act effectively as a leak proof gasket; it has been found however that notwithstanding this load, such shear stresses as may arise in tablet 16 in the vicinity of bore 14 are not transmitted laterally to any extent sufficient under (normal working temperatures) to cause extrusion of the fusible material into or through holes 22. When temperature of tablet 16 is abnormally high enough to fluidise it, the fusible material readily flows through holes 22.

Figure 3:
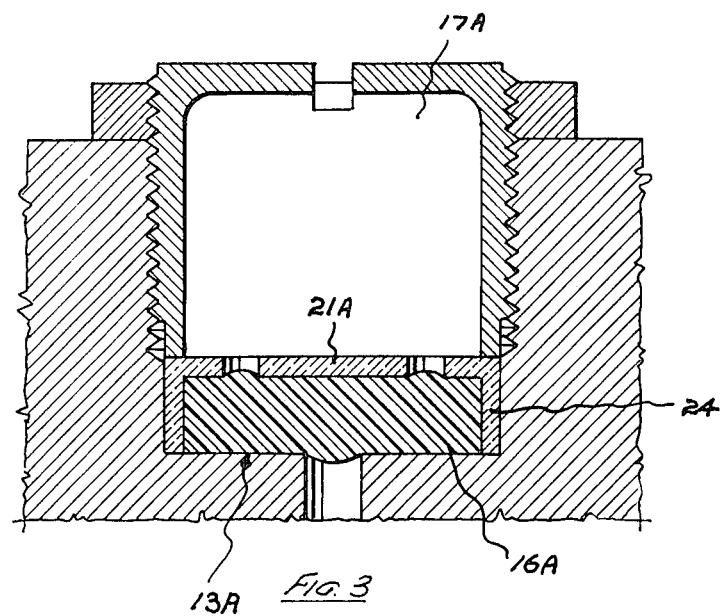
FIG. 3 is a view similar to FIG. 2 showing a minor modification.

The arrangement of FIG. 3 is the same as that of FIG. 2 except that the rigid plate 21A has a peripherally-extending, depending skirt (24) on it. The length of this skirt is such that when the skirt is positioned on top of the tablet 16A, and before any compressive loading is applied to that tablet, the skirt does not quite reach to the counterbore floor 13A. When, the sleeve 17A is then tightened, the skirt eventually bottoms on floor 13A, and when this happens it gives a person tightening the sleeve 17A a "feel" indication that further tightening of the sleeve is not necessary since, when that occurs, the tablet 16A will have been sufficiently compressed to perform its gasket function satisfactorily.

I claim:

1. A fusible safety device for a pressure vessel having a counter-bore formed in the vessel wall with an outer end open to atmosphere and an inner end defined by a floor, and a vent bore having an inner end open to the vessel interior and an outer end opening to said floor; comprising:

(a) a tablet of fusible material able to rest on said floor in coverage of the outer end of said vent bore, (b) a sleeve screw-threaded into said counter-bore, (c) a rigid pressure plate tightly sandwiched between said tablet and said sleeve, and (d) at least one hole in said pressure plate axially displaced relative to said vent bore.

2. A device according to claim 1 wherein said pressure plate is of uniform thickness and said tablet is of substantially the same diameter as said plate.

3. A device according to claim 1 wherein said pressure plate has a peripherally extending depending skirt able to receive said tablet within it, the depth of said skirt relative to that of said tablet being such that said skirt can be brought into touch with said floor upon compression of said tablet.

* * * * *